United States Patent
Hou et al.

(10) Patent No.: US 12,242,301 B2
(45) Date of Patent: Mar. 4, 2025

(54) FLEXIBLE SCREEN SUPPORT DEVICE AND FLEXIBLE SCREEN TERMINAL

(71) Applicant: KunShan Go-Visionox Opto-Electronics Co., Ltd., Jiangsu (CN)

(72) Inventors: Hongqi Hou, Kunshan (CN); Fu Liao, Kunshan (CN); Zhaoji Zhu, Kunshan (CN); Yuhua Wu, Kunshan (CN); Kanglong Sun, Kunshan (CN); Liwei Ding, Kunshan (CN)

(73) Assignee: KunShan Go-Visionox Opto-Electronics Co., Ltd., Kunshan (CN)

(*) Notice: Subject to any disclaimer, the term of this patent is extended or adjusted under 35 U.S.C. 154(b) by 209 days.

(21) Appl. No.: 17/841,302

(22) Filed: Jun. 15, 2022

(65) Prior Publication Data

US 2022/0308634 A1    Sep. 29, 2022

Related U.S. Application Data

(63) Continuation of application No. PCT/CN2021/083266, filed on Mar. 26, 2021.

(30) Foreign Application Priority Data

May 7, 2020  (CN) ........................ 202010377169.4

(51) Int. Cl.
*G06F 1/16*   (2006.01)

(52) U.S. Cl.
CPC .......... *G06F 1/1652* (2013.01); *G06F 1/1616* (2013.01); *G06F 1/1641* (2013.01); *G06F 1/1681* (2013.01)

(58) Field of Classification Search
CPC .... G06F 1/1652; G06F 1/1616; G06F 1/1641; G06F 1/1681; G09F 9/301; F16C 11/04; H04M 1/0268; H05K 5/0226
See application file for complete search history.

(56) References Cited

U.S. PATENT DOCUMENTS 9,348,450 B1 *  5/2016  Kim .................... H04M 1/0268
10,365,691 B2 *  7/2019  Bae ........................ G06F 1/1652
(Continued)

FOREIGN PATENT DOCUMENTS

| CN | 105491193 A | 4/2016 |
| CN | 106255935 A | 12/2016 |

(Continued)

OTHER PUBLICATIONS

PCT International Search Report for International Application No. PCT/CN2021/083266 dated Jun. 24, 2021.

(Continued)

*Primary Examiner* — Rockshana D Chowdhury
(74) *Attorney, Agent, or Firm* — Rimon PC

(57) ABSTRACT

The present application provides a flexible screen support device and a flexible screen inward bending terminal. The flexible screen support device includes a first housing and a second housing connected through a rotating assembly. The first housing includes a first part and a second part that are rotatably connected, and the first part is located on one side, close to the rotating assembly, of the second part. The second housing includes a third part and a fourth part that are rotatably connected, and the third part is located on one side, close to the rotating assembly, of the fourth part. In a process of switching from the unfolded state to the folded state, the first part of the first housing and the third part of the second housing rotate in opposite directions to form an accommodating space above the rotating assembly.

18 Claims, 5 Drawing Sheets

(56) References Cited

U.S. PATENT DOCUMENTS

| | | | |
|---|---|---|---|
| 10,831,243 B2 * | 11/2020 | Kim | G06F 1/1652 |
| 11,016,530 B2 * | 5/2021 | Watamura | G06F 1/1652 |
| 11,194,366 B2 * | 12/2021 | Cheng | G06F 1/1652 |
| 11,223,710 B2 * | 1/2022 | Cheng | H04M 1/0268 |
| 11,385,686 B2 * | 7/2022 | Ai | G06F 1/1616 |
| 11,467,633 B2 * | 10/2022 | Liao | F16C 11/04 |
| 11,474,570 B2 * | 10/2022 | Lee | G06F 1/1652 |
| 11,615,722 B2 * | 3/2023 | Morino | G06F 1/1616 345/173 |
| 11,662,781 B2 * | 5/2023 | Kang | G06F 1/1652 361/679.01 |
| 11,792,946 B2 * | 10/2023 | Park | H05K 5/0017 361/679.01 |
| 11,846,997 B2 * | 12/2023 | Liao | H04M 1/0216 |
| 11,917,780 B2 * | 2/2024 | Caplow-Munro | H05K 5/0017 |
| 2012/0044620 A1 * | 2/2012 | Song | H04M 1/0216 361/679.01 |
| 2015/0233162 A1 * | 8/2015 | Lee | H04M 1/022 16/223 |
| 2019/0174645 A1 | 6/2019 | Eon et al. | |
| 2020/0137907 A1 | 4/2020 | Kang et al. | |

FOREIGN PATENT DOCUMENTS

| | | |
|---|---|---|
| CN | 107358874 A | 11/2017 |
| CN | 107767775 A | 3/2018 |
| CN | 109257460 A | 1/2019 |
| CN | 208421694 U | 1/2019 |
| CN | 208686793 U | 4/2019 |
| CN | 109780403 A | 5/2019 |
| CN | 209164358 U | 7/2019 |
| CN | 209309117 U | 8/2019 |
| CN | 110324439 A | 10/2019 |
| CN | 209545628 U | 10/2019 |
| CN | 110430294 A | 11/2019 |
| CN | 209861327 U | 12/2019 |
| CN | 111583791 A | 8/2020 |
| KR | 20160035660 A | 4/2016 |

OTHER PUBLICATIONS

PCT Written opinion for International Application No. PCT/CN2021/083266 dated Jun. 24, 2021.

Chinese first office action for application No. 202010377169.4 dated Aug. 3, 2021.

* cited by examiner

FLEXIBLE SCREEN SUPPORT DEVICE AND FLEXIBLE SCREEN TERMINAL

CROSS-REFERENCE TO RELATED APPLICATIONS

The application is a Continuation application of PCT application No. PCT/CN2021/083266, filed on Mar. 26, 2021, which claims priority of Chinese patent application No. 202010377169.4, filed on May 7, 2020. All of the aforementioned applications are incorporated herein by reference in their entireties.

TECHNICAL FIELD

The present application relates to the field of flexible display technologies, and in particular, to a flexible screen support device and a flexible screen terminal.

BACKGROUND

With the rapid development of flexible display technologies, flexible screens are gradually applied to various display terminals by virtue of an ultra-thin property, a bending property, and other excellent characteristics. A display terminal includes a flexible screen inward bending terminal and a flexible screen outward bending terminal depending on different bending directions of a flexible screen. For the flexible screen inward bending terminal, an accommodating space is usually reserved at a rotating shaft of a support housing, to avoid squeezing of the support housing after folding on the flexible screen at a bending part. In this case, a bending region of the flexible screen after being folded is lack of support, which may easily damage the flexible screen due to excessive bending.

SUMMARY

In view of this, embodiments of the present application aim to provide a flexible screen support device and a flexible screen terminal, to resolve a problem in the prior art that a flexible screen inward folding terminal is easy to be damaged due to excessive bending of the flexible screen.

A first aspect of the present application provides a flexible screen support device, including a first housing and a second housing connected through a rotating assembly. The first housing and the second housing rotate between an unfolded state and a folded state; the first housing includes a first part and a second part that are rotatably connected, and the first part is located on one side, close to the rotating assembly, of the second part. The second housing includes a third part and a fourth part that are rotatably connected, and the third part is located on one side, close to the rotating assembly, of the fourth part. In a process of switching from the unfolded state to the folded state, the first part rotates around the second part, the third part rotates around the fourth part, and the first part of the first housing and the third part of the second housing rotate in opposite directions to form an accommodating space above the rotating assembly.

A second aspect of the present application provides a flexible screen terminal, including: the flexible screen support device provided in any one of the foregoing embodiments; a flexible screen, connected to the first housing and the second housing; and a central control circuit board, electrically connected to the flexible screen.

According to the flexible screen support device and the flexible screen inward bending terminal provided in the present application, a first housing and a second housing that are rotatably connected are implemented as two parts that are rotatably connected. In a folded state, a first part of the first housing and a third part of the second housing cooperate with each other to form side walls of an accommodating space, which may limit a bending radius of a flexible screen, thereby preventing the flexible screen from being excessively bent, and improving reliability.

DETAILED DESCRIPTION

In order to make objectives, technical means and advantages of the present application clearer, a further detailed description on the present application will be given below in combination with accompanying drawings.

Figure 1:
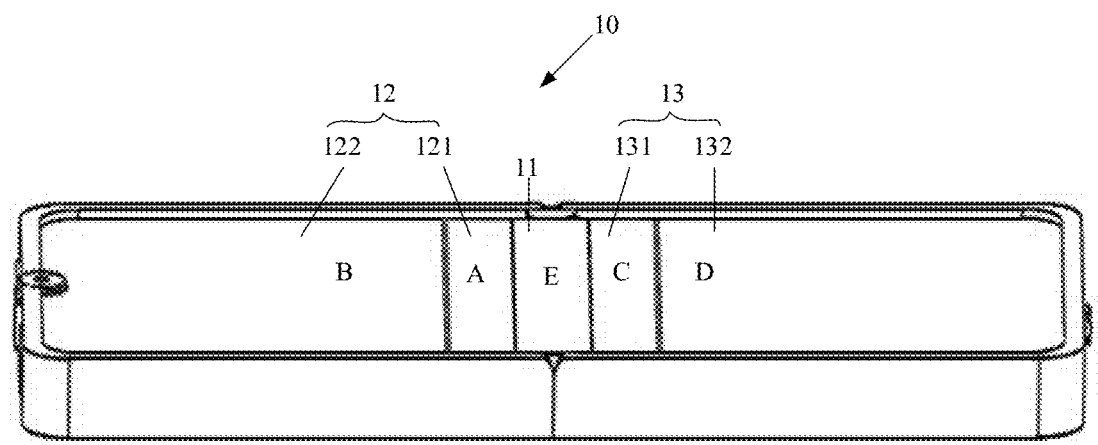
FIG. 1 is a schematic structural diagram of a flexible screen support device in a first state according to an embodiment of the present application.
Figure 2:
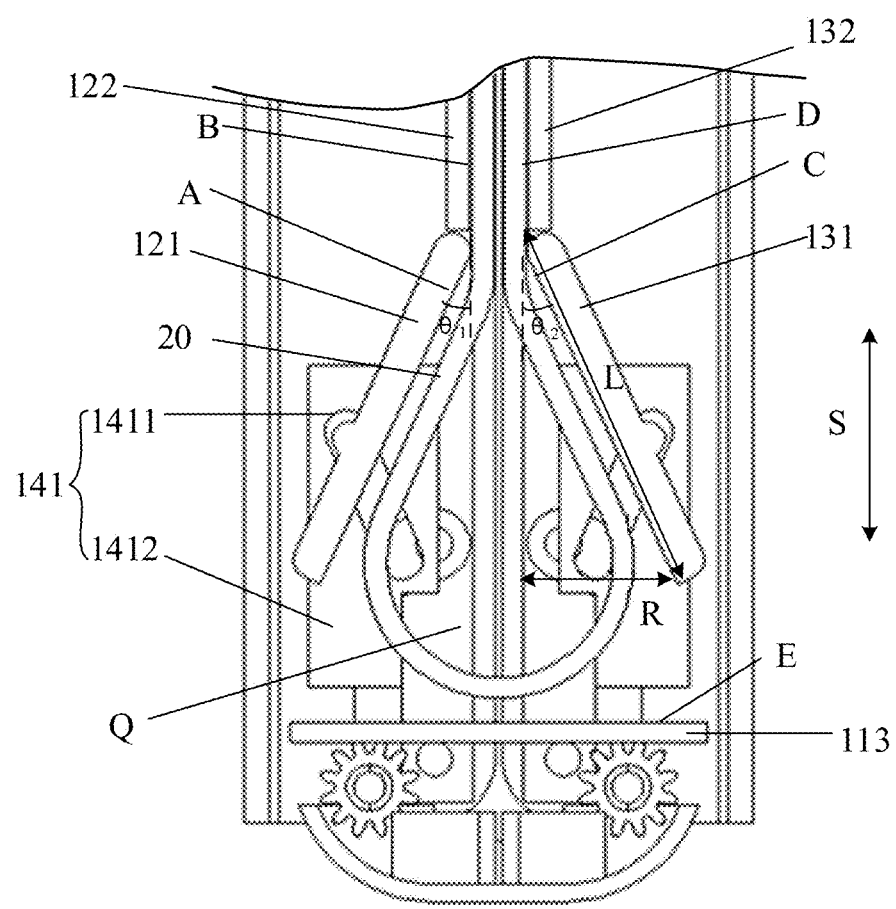
FIG. 2 is a schematic structural diagram of the flexible screen support device shown in FIG. 1 in a second state.

FIG. 1 is a schematic structural diagram of a flexible screen support device in a first state according to an embodiment of the present application. FIG. 2 is a schematic structural diagram of the flexible screen support device shown in FIG. 1 in a second state. The flexible screen support device is applicable to a flexible screen inward bending terminal, and is configured to provide support for a flexible screen, so as to make the flexible screen folded and unfolded. Referring to FIG. 1 and FIG. 2, the flexible screen support device 10 includes a first housing 12 and a second housing 13 that are connected through a rotating assembly 11. The first housing 12 and the second housing 13 rotate between an unfolded state and a folded state, namely, an unfolded state and a folded state of the flexible screen support device 10. The first housing 12 includes a first part 121 and a second part 122 that are rotatably connected. The second housing 13 includes a third part 131 and a fourth part 132 that are rotatably connected. The first part 121 is located on one side, close to the rotating assembly 11, of the second part 122, and the third part 131 is located on one side, close to the rotating assembly 11, of the fourth part 132. In a process of switching from the unfolded state to the folded state, the first part 121 rotates around the second part 122, the third part 131 rotates around the fourth part 132, and the first part 121 and the third part 131 rotate in opposite directions to form an accommodating space above the rotating assembly 11.

The rotating assembly 11 is configured to implement relative rotation between the first housing 12 and the second housing 13, for example, formed as gear or rotating shaft.

As shown in FIG. 1, the first housing 12 includes the first part 121 and the second part 122 that are rotatably connected, and the first part 121 is located on one side, close to the rotating assembly 11, of the second part 122. The second housing 13 includes the third part 131 and the fourth part 132 that are rotatably connected, and the third part 131 is located on one side, close to the rotating assembly 11, of the fourth part 132. In a process of the flexible screen support device 10 switching from the unfolded state shown in FIG. 1 to the folded state shown in FIG. 2, the first part 121 rotates around the second part 122 clockwise, and the third part 131 rotates around the fourth part 132 anticlockwise. When the flexible screen support device 10 is in the folded state shown in FIG. 2, in a direction S perpendicular to a rotation axis of the rotating assembly 11, the first part 121 and the third part 131 are formed in an inverted-V shape, to form an accommodating space Q above the rotating assembly 11 for accommodating a bending region of the flexible screen, and limiting the bending region of the flexible screen to be in a water-drop shape.

Specifically, the first part 121 includes a first bearing surface A, the second part 122 includes a second bearing surface B, the third part 131 includes a third bearing surface C, and the fourth part 132 includes a fourth bearing surface D. In the unfolded state, as shown in FIG. 1, the first bearing surface A, the second bearing surface B, the third bearing surface C, and the fourth bearing surface D are in a same plane. The plane may be configured to support the flexible screen, so as to make the flexible screen unfolded. In the folded state, as shown in FIG. 2, the second bearing surface B and the fourth bearing surface D are face to face. The first bearing surface A and the second bearing surface B have a first predetermined angle θ1 therebetween, and the third bearing surface C and the fourth bearing surface D have a second predetermined angle θ2 therebetween. A distance between ends, close to the rotating assembly 11, of the first bearing surface A and the third bearing surface C is greater than a distance between ends, away from the rotating assembly 11, of the first bearing surface A and the third bearing surface C. In this way, the first bearing surface A and the third bearing surface C may form side walls of the accommodating space above the rotating assembly 11. Subsequently, after the flexible screen is mounted on the flexible screen support device 10, when the flexible screen support device 10 is in the folded state, a cross-sectional face of the bending region of the flexible screen is in a water-drop shape.

Further, in a process of switching from the unfolded state to the folded state, the first bearing surface A and the third bearing surface C always provide support for at least part of the bending region of the flexible screen, which may reduce a probability of damage due to lack of support in the bending region.

A region that is referred to as being "above the rotating assembly 11" herein means an orthographic projection region of the rotating assembly 11 in a folding direction. When the flexible screen is under the flexible screen support device 10, the accommodating space Q is formed below the rotating assembly 11. A position of the accommodating space Q relative to the rotating assembly 11 changes, according to a position of the flexible screen relative to the flexible screen support device 10. Therefore, the term "above the rotating assembly 11" herein related to directions is only exemplary description, and should not be used as a limiting condition.

According to the flexible screen support device 10 provided in the embodiment, the first housing 12 and the second housing 13 are performed as two parts that are rotatably connected. It may achieve the following technical effects. First, the first part 121 and the third part 131 provide support for at least part of the bending region of the flexible screen, which reduces a probability of damage due to lack of support in the bending region. Second, in the folded state, the first part 121 and the third part 131 cooperate with each other to form the accommodating space, so as to accommodate the bending region of the flexible screen, thereby avoiding squeezing the flexible screen at the bending region. Third, the first part 121 and the third part 131 are used as side walls of the accommodating space, a bending radius of the flexible screen would be confined, thereby preventing the flexible screen from being bent excessively, and improving reliability.

Figure 3:
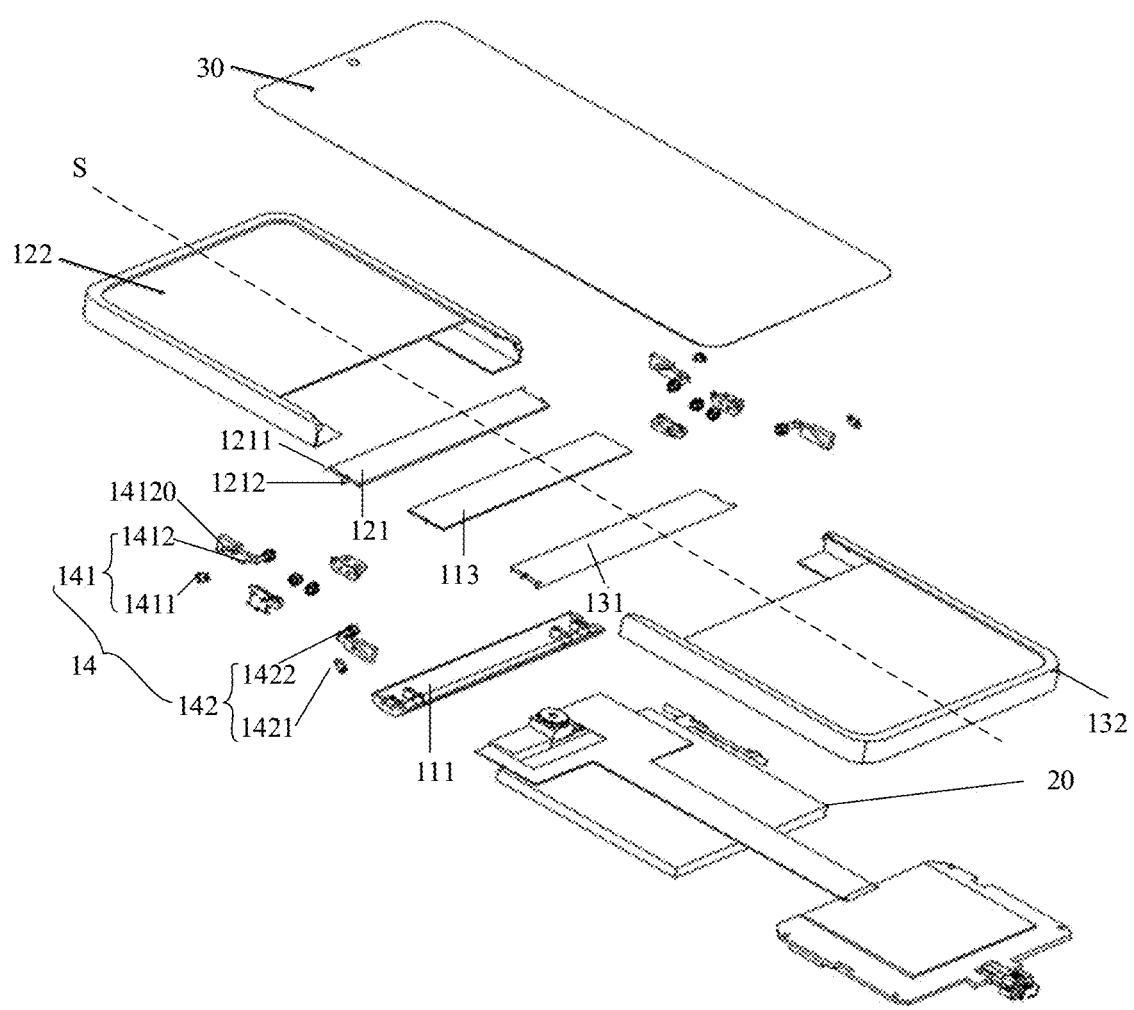
FIG. 3 is an exploded view of the flexible screen support device shown in FIG. 1 according to an embodiment of the present application.
Figure 4:
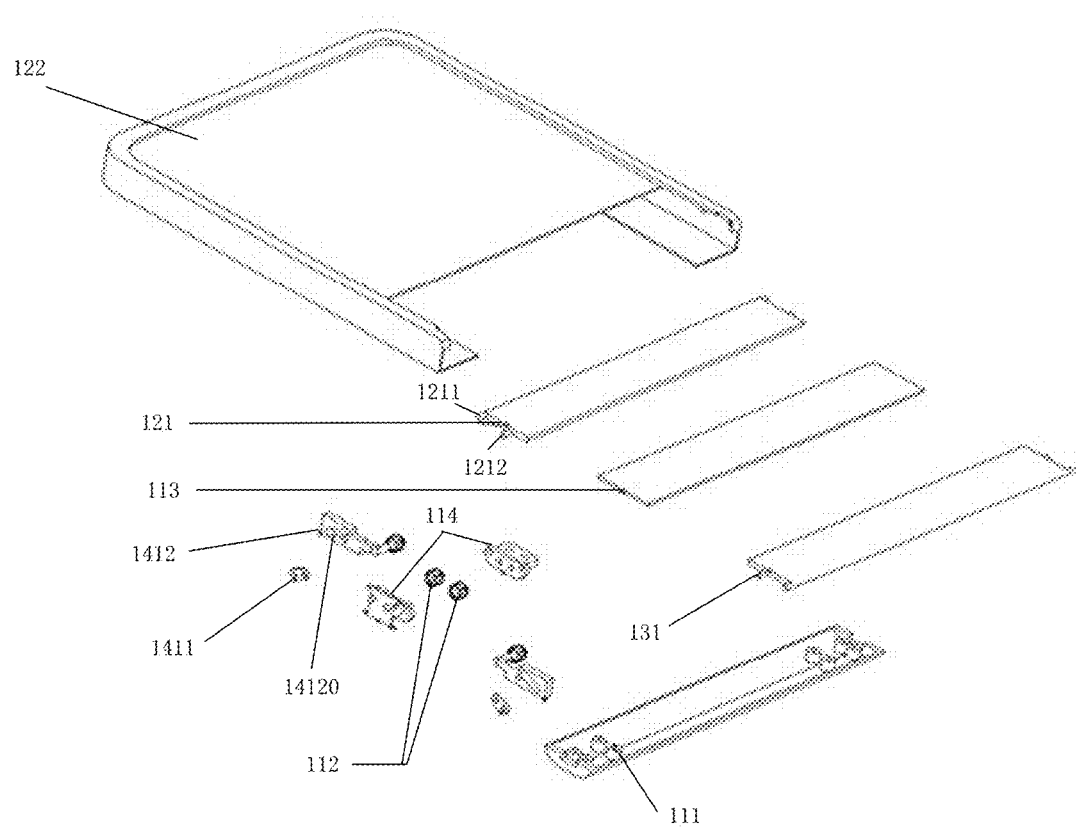
FIG. 4 is a partially enlarged view of the exploded view shown in FIG. 3.
Figure 5:
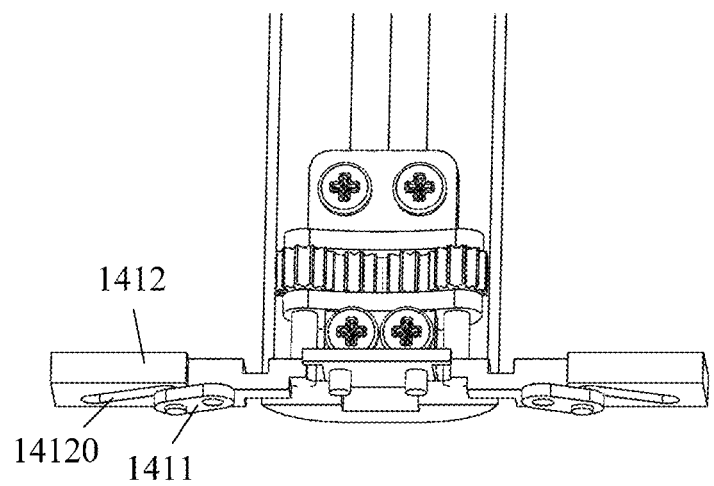
FIG. 5 is a schematic diagram of a partial structure of the flexible screen support device shown in FIG. 1.

FIG. 3 is an exploded view of the flexible screen support device shown in FIG. 1 according to an embodiment of the present application. FIG. 4 is a partially enlarged view of the exploded view shown in FIG. 3. FIG. 5 is a schematic diagram of a partial structure of the flexible screen support device shown in FIG. 1. The following describes a specific structure of the flexible screen support device 10 in detail below in combination with FIG. 3, FIG. 4, and FIG. 5.

In an embodiment, as shown in FIG. 3, the flexible screen support device 10 further includes at least one group of connecting rod assemblies 14. The connecting rod assembly of the at least one group of connecting rod assemblies 14 connecting the second part 122 and the rotating assembly 11, and connecting the fourth part 132 and the rotating assembly 11, to convert an acting force exerted on the second part 122 and the fourth part 132 into a rotating force of the rotating assembly 11. In other words, the acting force exerted on the second part 122 of the first housing 12 and the fourth part 132 of the second housing 13, is transmitted by the connecting rod assemblies 14, to drive the rotating assembly 11 to rotate. Specifically, the flexible screen support device 10 includes two groups of connecting rod assemblies 14. The two groups of connecting rod assemblies 14 are disposed on two opposite sides of the rotating assembly 11, respectively. As shown in FIG. 3, the two groups of connecting rod assemblies 14 are symmetrical with respect to the axis S perpendicular to the rotating assembly 11. With respect with the axis in FIG. 3, a first group of connecting rod assemblies 14 are located on the left side of the rotating assembly 11 and connected with the second part 122 of the first housing 12 and the rotating assembly 11, and the fourth part 132 of the second housing 13 and the rotating assembly 11. With respect with the axis in FIG. 3, a second group of connecting rod assemblies 14 are located on the right side of the rotating assembly 11, and connected with the second part 122 of the first housing 12 and the rotating assembly 11, and the fourth part 132 of the second housing 13 and the rotating assembly 11. When a pressure force or tensile force is exerted on one or more of the second part 122 of the first housing 12 and the fourth part 132 of the second housing 13, the acting force is transmitted to the rotating assembly 11 by the connecting rod assemblies 14 and drives the rotating assembly 11 to rotate. In other words, the acting force exerted on one or more of the second part 122 of the first housing 12 and the fourth part 132 of the second housing 13 is transmitted by the connecting rod assemblies 14, to drive the rotating assembly 11 to rotate.

One group of connecting rod assemblies 14 are used as an example. Referring to FIG. 3, FIG. 4, and FIG. 5, the group of connecting rod assemblies 14 include a first connecting rod assembly 141 and a second connecting rod assembly 142. The first connecting rod assembly 141 includes a first connecting rod 1411 and a second connecting rod 1412 that are rotatably connected. One end of the first connecting rod 1411 is rotatably connected to the second part 122, the other end of the first connecting rod 1411 is rotatably connected to a first end of the second connecting rod 1412, and a second end of the second connecting rod 1412 is fixed to the rotating assembly 11. The second connecting rod assembly 142 includes a third connecting rod 1421 and a fourth connecting rod 1422 that are rotatably connected. One end of the third connecting rod 1421 is rotatably connected to the fourth part 132, the other end of the third connecting rod 1421 is rotatably connected to a first end of the fourth connecting rod 1422, and a second end of the fourth connecting rod 1422 is fixed to the rotating assembly 11.

When a thrust force is exerted on the second part 122 of the first housing 12 and the fourth part 132 of the second housing 13, the thrust force is converted by one group of connecting rod assemblies 14 to achieve two effects: first, the rotating assembly 11 is pushed to rotate; and second, the second part 122 of the first housing 12 and the fourth part 132 of the second housing 13 are pushed to move away from the rotating assembly 11.

According to the flexible screen support device 10 provided in the embodiment, the acting force exerted on the second part 122 of the first housing 12 and the fourth part 132 of the second housing 13 is converted into a rotating force of the rotating assembly 11 by one group of connecting rod assemblies 14. In a process of the second part 122 and the fourth part 132 rotating around the rotating assembly 11, it is ensured that the second part 122 and the fourth part 132 are gradually away from the rotating assembly 11, further providing a space for a bending region of the flexible screen.

In an embodiment, the connecting rod assembly is further slidably connected to the first part 121 and the third part 131 respectively.

One group of connecting rod assemblies 14 are still used as an example. The second connecting rod 1412 of the first connecting rod assembly 141 is slidably connected to the first part 121, and the first part 121 is rotatably connected to the second part 122. The third connecting rod 1421 of the second connecting rod assembly 142 is slidably connected to the third part 131, and the third part 131 is rotatably connected to the fourth part 132. In this case, in a process of the second part 122 and the fourth part 132 rotating around the rotating assembly 11, one group of connecting rod assemblies 14 are further configured to push the first part 121 to rotate around the second part 122 and push the third part 131 to rotate around the fourth part 124, to form an angle between the first bearing surface A and the second bearing surface B, and an angle between the third bearing surface C and the fourth bearing surface D, thereby forming the accommodating space above the rotating assembly 11.

Specifically, each of the second connecting rod 1412 and the fourth connecting rod 1422 is provided with a sliding groove, each of the first part 121 and the third part 131 is provided with a protrusion slidable in the sliding groove. A connection relationship between the second connecting rod 1412 and the first part 121 is used as an example. As shown in FIG. 4, two opposite sides of the first part 121 include a first protrusion 1211 and a second protrusion 1212, respectively. The first protrusion 1211 and the second protrusion 1212 are linearly arranged in an axis direction perpendicular to the rotating assembly 11. The first protrusion 1211 is closer to the second part 122 of the first housing 12, than the second protrusion 1212. The first protrusion 1211 is located at an end of the first part 121, while the second protrusion 1212 is located in a central region of the first part 121. The first protrusion 1211 is rotatably connected to a groove of the second part 122. The second protrusion 1212 is in slidable in the sliding groove 14120 in the second connecting rod 1412. A connection relationship between the fourth connecting rod 1422 and the third part 131 and a connection relationship between the second connecting rod 1412 and the first part 121 are symmetrical with respect to the rotating assembly 11. Details are not described herein again.

According to the flexible screen support device 10 provided in the embodiment, an acting force exerted on the second part 122 of the first housing 12 is further converted, by one group of connecting rod assemblies 14, into a rotating force to drive the first part 121 to rotate around the second part 122; and an acting force exerted on the fourth part 132 of the second housing 13 is further converted into a rotating force to drive the third part 131 to rotate around the fourth part 132, so as to form an accommodating space above the rotating assembly 11. Therefore, the flexible screen support device 10 has a simple structure and is easy to implement.

In the embodiment, as shown in FIG. 5, in the unfolded state, there is a third predetermined angle between a surface of the first housing 12 and the second housing 13, i.e., the first bearing surface A and the third bearing surface C, and an extension direction of a corresponding sliding groove. The third predetermined angle determines a size of an angle between the first part 121 and the second part 122, and a size of another angle between the third part 131 and the fourth part 132 in the folded state. However, the sizes of the two angles are formed according to a bending angle of the flexible screen. Therefore, an extension direction of the sliding groove 14120 may be properly set based on a bending angle of the flexible screen.

In an embodiment, the rotating assembly 11 includes a first rotating shaft and a second rotating shaft that are connected through a transmission component, the second part 122 of the first housing 12 is rotatably connected to the first rotating shaft, and the fourth part 132 of the second housing 13 is rotatably connected to the second rotating shaft.

Specifically, referring to FIG. 4 and FIG. 5, the rotating assembly 11 includes a lower housing 111, two gear sets respectively fixed at two opposite ends of the lower housing 111 through a gear fixed base 114, and the two gear sets are symmetrical with respect to the axis S perpendicular to the rotating assembly 11. Each gear set includes a first gear and a second gear that are connected through a transmission component 112. In the embodiment, the first gear is integrally formed with the second connecting rod 1412 of the first connecting rod assembly 141, and the second gear is integrally formed with the fourth connecting rod 1422 of the second connecting rod assembly 142. The first gear of the two gear sets is used to constitute a first rotating shaft, and the second gear of the two gear sets is used to constitute a second rotating shaft. The transmission component 112 is performed as transmission gear sets. A number of gears included in the transmission gear sets may be properly set according to actual requirements. In the embodiment, the two gears are used to constitute the transmission gear sets.

According to the flexible screen support device provided in the embodiment, the transmission component is disposed, which can ensure that the second part 122 of the first housing 12 and the fourth part 132 of the second housing 13 move synchronously.

In an embodiment, the rotating assembly 11 further includes an upper cover plate 113 connected to both the first rotating shaft and the second rotating shaft. The upper cover plate 113 includes a fifth bearing surface E. In the unfolded state shown in FIG. 1, the fifth bearing surface E is parallel to surfaces of the first housing 12 and the second housing 13. The fifth bearing surface E is coplanar with the first bearing surface A and the third bearing surface C adjacent to the fifth bearing surface E, respectively. Further, the second bearing surface B, the first bearing surface A, the fifth bearing surface E, the third bearing surface C, and the fourth bearing surface D are arranged in sequence to form an overall support surface for supporting the flexible screen. In this way, a better supporting effect is achieved. In the folded state in FIG. 2, the fifth bearing surface of the upper cover plate 113 is separated from the first bearing surface A and the third bearing surface C, to further form an accommodating space, thereby avoiding squeezing the flexible screen at the bending region.

The present application further provides a flexible screen inward bending terminal. As shown in FIG. 3, the flexible screen inward bending terminal includes the flexible screen support device 10 provided in any one of the foregoing embodiments, and further includes: a flexible screen 20 connected to both the first housing 12 and the second housing 13, and a central control circuit board 30 electrically connected to the flexible screen 20. The central control circuit board 30 is configured to drive the flexible screen 20 to implement a display function.

In an embodiment, one or more of a length (hereinafter referred to as a length of the first part) and a rotation angle of the first part in a direction perpendicular to a rotation axis of the rotating assembly are formed according to an inward bending radius of the flexible screen. Due to a limitation to a material and a structure of the flexible screen 20, the flexible screen 20 generally has a minimum inward bending radius. When a bending degree exceeds the minimum inward bending radius, it is easy to damage the flexible screen 20. Therefore, the length of the first part and the rotation angle need to be properly set based on the minimum inward bending radius of the flexible screen 20, thereby avoiding damage to the flexible screen 20.

Specifically, referring to FIG. 2, a rotation angle of the third part 131 of the second housing 13 relative to the fourth part 132, i.e., the second predetermined angle $\theta_2$, is used as an example. The rotation angle, the length L of the third part 131, and the inward bending radius R of the flexible screen 20 meet a relationship as follows: $\theta_2 = \arcsin(R/L)$.

The foregoing examples are used for purposes of illustration and description. In addition, the description is not intended to limit the embodiments of the present application to the forms disclosed herein. Although a number of exemplary aspects and embodiments have been discussed above, those skilled in the art will recognize some variations, modifications, changes, additions, and sub-combinations thereof

What is claimed is:

1. A flexible screen support device, comprising:
a first housing and a second housing connected through a rotating assembly, wherein the first housing and the second housing rotate between an unfolded state and a folded state; the first housing comprises a first part and a second part that are rotatably connected, and the first part is located on one side, close to the rotating assembly, of the second part; and the second housing comprises a third part and a fourth part that are rotatably connected, and the third part is located on one side, close to the rotating assembly, of the fourth part;
in a process of switching from the unfolded state to the folded state, the first part rotates around the second part, the third part rotates around the fourth part, and the first part and the third part rotate in opposite directions to form an accommodating space above the rotating assembly,
wherein when the flexible screen support device is in the unfolded state, the first part and the third part are configured to support a flexible screen in a thickness direction of the first part and the third part, and the thickness direction of the first part and the third part is perpendicular to a display surface of the flexible screen, wherein a length and a rotation angle of the first part in a direction perpendicular to a rotation axis of the rotating assembly are formed according to an inward bending radius of the flexible screen.

2. The flexible screen support device according to claim 1, wherein the first part comprises a first bearing surface, the second part comprises a second bearing surface, the third part comprises a third bearing surface, and the fourth part comprises a fourth bearing surface;
in the unfolded state, the first bearing surface, the second bearing surface, the third bearing surface, and the fourth bearing surface are coplanar; and
in the folded state, the second bearing surface and the fourth bearing surface are face to face, the first bearing surface and the second bearing surface have a first predetermined angle therebetween, the third bearing surface and the fourth bearing surface have a second predetermined angle therebetween, and a distance between ends, close to the rotating assembly, of the first bearing surface and the third bearing surface is greater than a distance between ends, away from the rotating assembly, of the first bearing surface and the third bearing surface.

3. The flexible screen support device according to claim 2, further comprising at least one group of connecting rod assemblies, wherein the at least one group of connecting rod assemblies connect the second part and the rotating assembly, and connect the fourth part and the rotating assembly, to convert an acting force exerted on one or more of the second part or the fourth part into a rotating force of the rotating assembly.

4. The flexible screen support device according to claim 3, wherein the at least one group of connecting rod assemblies is further slidably connected to the first part and the third part.

5. The flexible screen support device according to claim 3, wherein the group of connecting rod assemblies comprise a first connecting rod assembly and a second connecting rod assembly; the first connecting rod assembly comprises a first connecting rod and a second connecting rod that are rotatably connected, the first connecting rod is rotatably connected to the second part, and the second connecting rod is connected to the rotating assembly; and the second connecting rod assembly comprises a third connecting rod and a fourth connecting rod that are rotatably connected, the third connecting rod is rotatably connected to the fourth part, and the fourth connecting rod is connected to the rotating assembly.

6. The flexible screen support device according to claim 5, wherein the rotating assembly comprises a lower housing, two gear sets respectively fixed at two opposite ends of the lower housing through a gear fixed base,
the two gear sets are symmetrical with respect to an axis perpendicular to the rotating assembly, each gear set comprises a first gear and a second gear that are connected through a transmission component, the first gear is integrally formed with the second connecting rod in the first connecting rod assembly, the second gear is integrally formed with the fourth connecting rod in the second connecting rod assembly, the first gear constitutes a first rotating shaft, and the second gear constitutes a second rotating shaft.

7. The flexible screen support device according to claim 5, wherein each of the second connecting rod and the fourth connecting rod is provided with a sliding groove, each of the first part of the first housing and the third part of the second housing is provided with a second protrusion, and the second protrusion is slidably accommodated in the sliding groove.

8. The flexible screen support device according to claim 7, wherein each of two opposite sides of the first part of the first housing is further provided with a first protrusion, the first protrusion and the second protrusion are linearly arranged in an axis direction perpendicular to the rotating assembly, the first protrusion is closer to the second part of the first housing than the second protrusion, the second part of the first housing is provided with a groove, and the first protrusion is rotatably connected to the groove of the second part.

9. The flexible screen support device according to claim 7, wherein in the unfolded state, the sliding groove extends along a direction having an angle with respect to a surface of the first housing and the second housing.

10. The flexible screen support device according to claim 2, wherein the rotating assembly comprises a first rotating shaft and a second rotating shaft that are connected through a transmission component, the second part is rotatably connected to the first rotating shaft, and the fourth part is rotatably connected to the second rotating shaft.

11. The flexible screen support device according to claim 10, wherein the rotating assembly further comprises an upper cover plate connected to both the first rotating shaft and the second rotating shaft, and the upper cover plate comprises a fifth bearing surface; and in the unfolded state, the fifth bearing surface is parallel to surfaces of the first housing and the second housing.

12. A flexible screen terminal, comprising:
the flexible screen support device according to claim 1;
a flexible screen, connected to the first housing and the second housing; and
a central control circuit board electrically connected to the flexible screen.

13. The flexible screen support device according to claim 2, wherein the first bearing surface, the second bearing surface, the third bearing surface and the fourth bearing surface are configured to support the flexible screen.

14. The flexible screen support device according to claim 11, wherein in the unfolded state, the fifth bearing surface is coplanar with the first bearing surface and the third bearing surface adjacent to the fifth bearing surface.

15. The flexible screen support device according to claim 14, wherein in the unfolded state, the second bearing surface, the first bearing surface, the fifth bearing surface, the third bearing surface, and the fourth bearing surface are arranged in sequence to form an overall support surface for supporting the flexible screen.

16. The flexible screen support device according to claim 1, wherein when the flexible screen support device is in the folded state, the first part and the third part are configured to support a part of a bending region of the flexible screen, respectively.

17. A flexible screen support device, comprising:
a first housing and a second housing connected through a rotating assembly, wherein the first housing and the second housing rotate between an unfolded state and a folded state; the first housing comprises a first part and a second part that are rotatably connected, and the first part is located on one side, close to the rotating assembly, of the second part; and the second housing comprises a third part and a fourth part that are rotatably connected, and the third part is located on one side, close to the rotating assembly, of the fourth part;
in a process of switching from the unfolded state to the folded state, the first part rotates around the second part, the third part rotates around the fourth part, and the first part and the third part rotate in opposite directions to form an accommodating space above the rotating assembly,
wherein when the flexible screen support device is in the folded state, the first part and the third part are configured to support a respective part of a bending region of the flexible screen, wherein a length and a rotation angle of the first part in a direction perpendicular to a rotation axis of the rotating assembly are formed according to an inward bending radius of the flexible screen.

18. A flexible screen terminal, comprising:
the flexible screen support device according to claim 17;
a flexible screen, connected to the first housing and the second housing; and
a central control circuit board electrically connected to the flexible screen.

* * * * *